Sept. 9, 1941. R. O. FRIEND ET AL 2,255,157
DISK DISTRIBUTOR FOR SEWAGE OR WATER DISTRIBUTION
Filed Aug. 13, 1938 2 Sheets-Sheet 1

R.O.Friend
J.A.Montgomery
W.F.Schaller
INVENTORS.

BY C.A.Snow & Co.
ATTORNEYS.

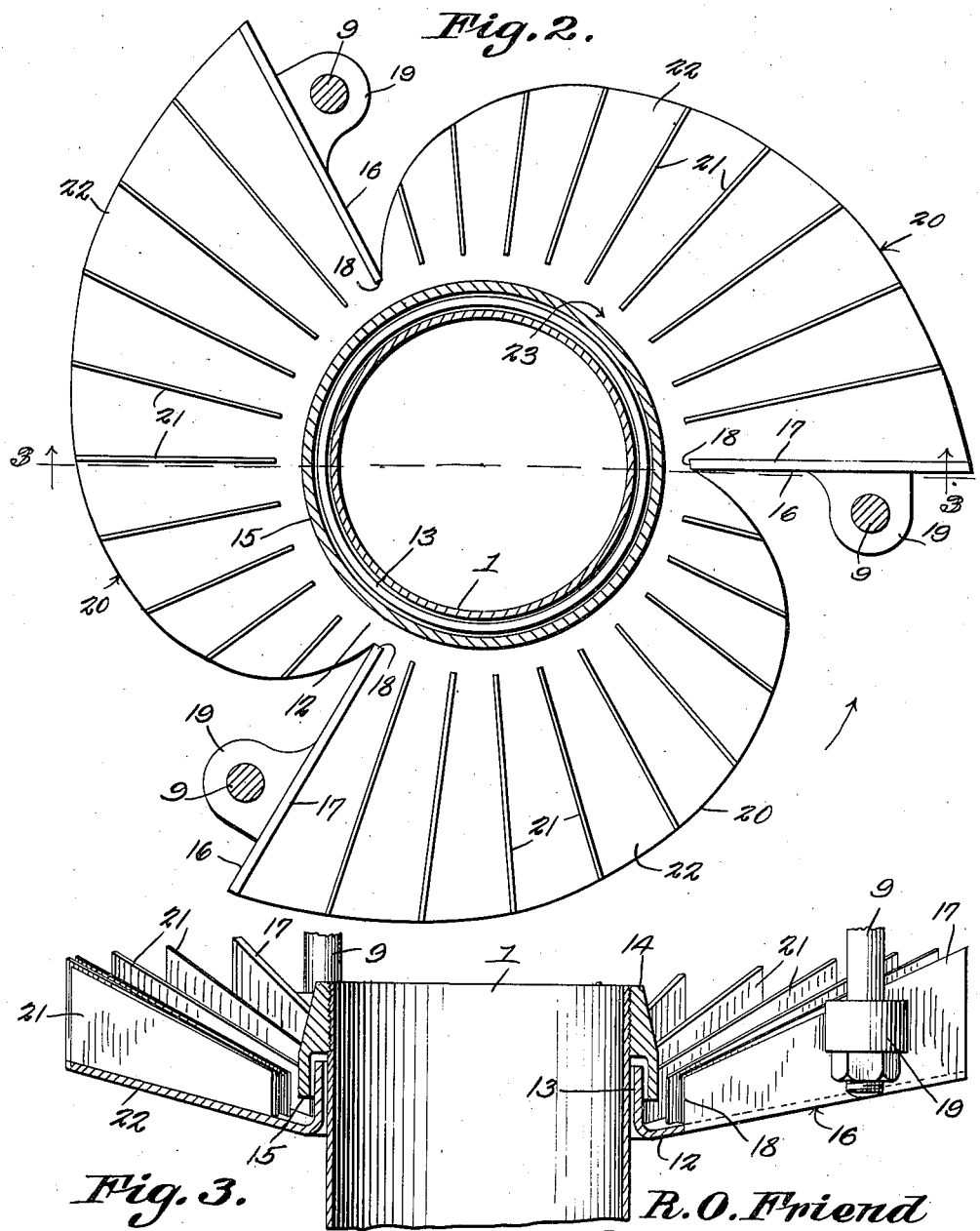

Patented Sept. 9, 1941

2,255,157

UNITED STATES PATENT OFFICE 2,255,157

DISK DISTRIBUTOR FOR SEWAGE OR WATER DISTRIBUTION

Robert O. Friend, Chicago, Ill., John A. Montgomery, Denver, Colo., and William F. Schaller, La Grange, Ill.

Application August 13, 1938, Serial No. 224,798

2 Claims. (Cl. 299—63)

This invention relates to a disk distributor designed primarily for use in trickling filter operation for sewage plants, an object being to provide a simple, and efficient mechanism for distributing water or sewage over the surface of a filtering media, the said distributor being designed primarily for use in carrying out, for example, the Halvorson-Smith process of sewage treatment.

It is a fact well established that a trickling filter will continue to produce satisfactory results with less attention and will stand more abuse than any other type of complete sewage treatment. Heretofore, however, filters of this type have been objectionable because of the high initial cost.

An object of the present invention is to provide a new and novel form of distributor the use of which reduces the cost of installation, and the operating cost whereby the treatment of sewage can be effected at a cost much lower than those of activated sludge plants or methods of chemical precipitation.

A still further object is to provide a distributor by means of which it becomes possible for the filter with which it is associated to treat approximately eight times the quantity of sewage per acre per day than is handled by standard sewage filters, it thus being possible to reduce the size and number of filters required for any installation.

A still further object is to provide a distributor which effects continuous and uniform application at a low and uniform rate which results in slow trickling of sewage over and through the media thereby providing a maximum period of contact with the bacteria and for aeration, maintaining non-freezing temperatures, and inducing constant washing away of the excess sludge so that ponding is eliminated and the release of septic odors is prevented.

Another object is to provide a new and novel form of distributor the actuation of which effects a more uniform distribution over the surface of the filter than has heretofore been possible, the distribution over the bed being along a radius approximating four-fifths the radius of the bed, the quantity of liquid applied instantaneously to any square foot of the bed within an area defined by four-fifths of the length of the radius of the bed exceeding not more than fifty per cent the quantity of liquid applied to any one of the remaining square feet of area within said defined space.

A still further object is to provide a distributor which is preferably motor driven and includes a novel arrangement of vanes and disk segments so proportioned and assembled as to effect the desired distribution at a predetermined speed of rotation.

A still further object is to utilize a distributor which does not require the use of a mercury seal to prevent backward flow of liquid under treatment.

With the foregoing and other objects in view which will appear as the description proceeds, the invention resides in certain novel details of construction and combinations of parts and certain steps in the method hereinafter more fully described and pointed out in the claims, it being understood that changes may be made in the construction and arrangement of the parts and in the steps of the method without departing from the spirit of the invention as claimed.

In the accompanying drawings the preferred form of the invention has been shown.

In said drawings

Figure 2 is a top plan view of the distributing disk, adjacent parts being shown in section.

Figure 3 is a section on line 3—3, Figure 2.

Figure 1:
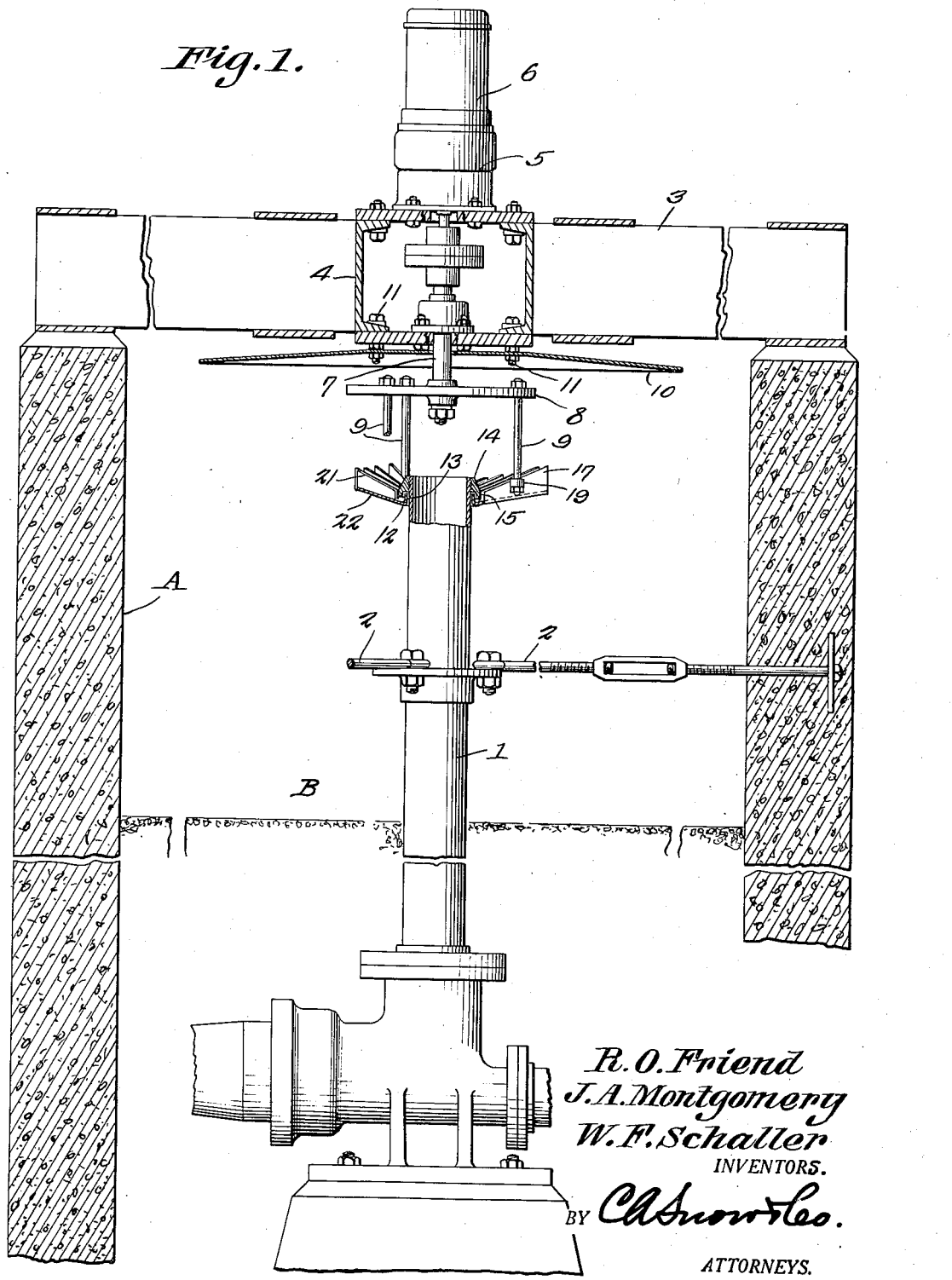
Figure 1 is a central vertical section through a trickling filter equipped with the distributor constituting the present invention, parts being shown in elevation.

Referring to the figures by characters of reference A designates the wall of a trickling filter the filtering bed or media being indicated at B.

The wall A is preferably circular and supported at the center of the filter is a feed pipe 1 which can be provided with suitably arranged braces 2 anchored in the wall of the filter structure as shown.

A suitable beam 3 or the like bridges the filter and preferably extends diametrically thereacross, this bridging structure including a coupling housing 4, there being speed reduction gearing indicated generally at 5 whereby motion is transmitted from a motor 6 to a depending shaft 7 carrying a disk 8 or the like provided with hangers 9. A splash plate 10 having a concave lower surface, is secured to the bridging element or beam 3 and extends around depending shaft 7, this plate being secured in position and held against rotation by supporting bolts 11 or other suitable means.

A disk 12 of novel construction is mounted for rotation about the upper portion of the pipe 1 and has an upwardly extending flange 13 at its inner edge which is overhung and surrounded by a diffuser in the form of a ring 14 having a depending flange 15 the lower edge of which is below the upper edge of flange 13 but above the adjacent surface of the disk 12.

As will be noted by referring to Figures 2 and 3, the distributing disk is of a new and novel configuration, this being necessary to effect the results to be obtained. The surface of the disk is inclined upwardly and outwardly away from flange 13 and said disk is formed with any desired member of radial edges 16 regularly spaced and provided with upstanding vanes 17 extending from the outer edge of the disk inwardly to a point where the upwardly extending inner edge 18 of the vane is spaced from the flange or apron 15 as shown particularly in Figure 3. If desired, however, the vanes can be extended inwardly to the collar or flange 13 and they can be made curved instead of straight according to the conditions under which the invention is used.

Ears 19 are extended from the wings 17 and are engaged by the hangers 9 so that the disk is thus held fixedly to and supported by disk 8 and, therefore, will rotate with the shaft 7.

Those portions of the distributor disk between the radial edges 16 have their outer edges curved forwardly and inwardly in the direction of rotation, each curved edge being extended from the outer end of one edge 16 to the inner end of the next edge 16 in advance thereof. The curvature of each of these edges 20 is such as to extend to the outer end of a plurality of radial wings 21 disposed on each segment 22 of the disk. The arc described by the outer end of each vane 21 on any segment of the disk is directly proportional to the area of the bed on which sewage or other liquid is to be discharged. The lengths of these vanes or wings are reduced in regular succession forwardly on their segments from the radial edge 16 of the segment, the rear or longest vane 17 on each segment being adapted to discharge the liquid on the outer section of the bed B whereas the shortest vane on each segment, which is located at the forward or advancing portion of the segment where the edge of the segment has the greatest arc curvature, will discharge the liquid on the inner section of the bed B.

The vanes form outwardly extending channels on the upwardly and outwardly inclined surfaces of the disk segment and while the vanes are preferably spaced apart regularly or equal distances, such an arrangement is not essential under all conditions.

It will be seen that all of the vanes terminate away from the apron 15 so that a narrow annular channel 23 is thus provided between the inner ends of all of the vanes and the upturned flange 13 of the disk.

As a result of the particular configuration of each segment of the disk and the location of the vanes on each segment, the relative amount of the total liquid being discharged on the various sections of the bed per square foot of area is quite constant. At flows ranging from one-third to the full capacity of any given bed, the application of the liquid to the surface of the filter per square foot of area and starting at the center of the filter and ranging outwardly to a total distance of four-fifths of the radius of the bed, will not vary more than fifty per cent of the discharge on any other square foot of bed area within the four-fifths radius of the bed. This distribution of the liquid over the bed results from the rotation of the disk by the means provided therefor. As the disk rotates the liquid being supplied to the filter emerges at the top of the pipe 1 and flows over into the radial channels 22 and into the paths of all of the vanes 17 and 21. The liquid flows over the curved edges of the segments and is propelled therefrom over a predetermined area by the advancing ends of the vanes and the resultant centrifugal force.

The hangers 9 are attached to the back ends of the segments and, because of their location, will in no way interfere with the discharge of liquid from the shorter vanes of the segment in rear thereof.

It has been found that it is unnecessary to use a mercury or packing seal between the disk and the inlet pipe 1 provided the inner ends of the vanes 17 and 21 are not spaced too far from the apron 15. It has been found in practice that when the disk is rotating normally at about three hundred to five hundred rotations per minute, the inner ends of the vanes following rapidly one after the other, produce a more or less effective wall which would prevent liquid from flowing outwardly into the spaces between the channels if the vanes should be spaced such distances from the pipe as to cause the overflowing fluid to fall into the annular channel 23 instead of into the spaces between the vanes.

While the disk has been shown pitched, it is to be understood that under some conditions it might be made flat.

What is claimed is:

1. A device for uniformly distributing liquid over a filter bed including a feed pipe open at its upper end, a disk mounted for rotation about the upper end portion of the pipe, radially disposed vanes on the disk providing radial channels positioned to receive at their inner ends liquid delivered from the pipe, the vanes on the disk being disposed in groups identical in structure with each other, the vanes in each group being of different lengths, the distance between the outer ends of the vanes of each group and the pipe decreasing in regular succession in the direction of rotation of the disk, said disk having edges defining unbroken curves and connecting the outer ends of the vanes of the respective groups, driving mechanism above the disk, means connected to the disk between the groups for supporting and transmitting motion to the disk, means for preventing back flow of liquid from the disk to the pipe, said means including an annular flange upstanding from the disk adjacent to the inner ends of the channels and above the level of the periphery of the disk, and a diffusing ring on the pipe and having a depending apron surrounding said flange.

2. A device for uniformly distributing liquid over a filter bed including a feed pipe open at its upper end, a disk mounted for rotation about the upper end portion of the pipe, radially disposed vanes on the disk providing radial channels positioned to receive at their inner ends liquid delivered from the pipe, the vanes on the disk being disposed in groups identical in structure with each other, the vanes in each group being of different lengths, the distance between the outer ends of the vanes of each group and the pipe decreasing in regular succession in the direction of rotation of the disk, said disk having edges defining unbroken curves and connecting the outer ends of the vanes of the respective groups, driving mechanism above the disk, and means connected to the disk between the groups for supporting and transmitting motion to the disk, and means for preventing back flow of liquid from the disk to the pipe, said means including an annular flange upstanding from the disk adjacent to the inner ends of the channels and above the level of the periphery of the disk, and a diffusing ring on the pipe and having a depending apron surrounding said flange, said disk being inclined upwardly and outwardly from the flanged portion to the periphery of the disk, said periphery being curved and connecting the outer ends of the vanes of each group and the outer end of the longest vane of the group to the inner end of the longest vane of the next group in advance thereof.

ROBERT O. FRIEND.
JOHN A. MONTGOMERY.
WILLIAM F. SCHALLER.